(No Model.)

W. A. JONES.
PROVISION SAFE.

No. 465,710. Patented Dec. 22, 1891.

WITNESSES
F. L. Durand
Robt. Johnson

INVENTOR
Walter A. Jones
By
Wm. L. Chamblin, Attorney.

UNITED STATES PATENT OFFICE.

WALTER ADOLPHUS JONES, OF BAGWELLS, TEXAS.

PROVISION-SAFE.

SPECIFICATION forming part of Letters Patent No. 465,710, dated December 22, 1891.

Application filed June 15, 1891. Serial No. 396,236. (No model.)

*To all whom it may concern:*

Be it known that I, WALTER ADOLPHUS JONES, a citizen of the United States, residing at Bagwells, in the county of Red River and State of Texas, have invented certain new and useful Improvements in Provision-Safes; and I do hereby declare the following to be a full, clear, and exact description of the invention, such as will enable others skilled in the art to which it appertains to make and use the same.

My invention relates to a pantry and kitchen safe combined and designed to be built apart from the house and constituting a distinct and removable piece of furniture; and the object of my invention is to provide a compactly-built and systematically-arranged pantry and kitchen safe in which all the articles, utensils, apartments, and compartments to be found in a well-organized pantry and kitchen safe combined, are methodically arranged and constructed with a view of expediting and aiding in the quick preparation of a meal. I attain said object by a certain construction, arrangement, and combination of parts fully described and illustrated in this specification and the accompanying drawings, in which—

Figure 1:
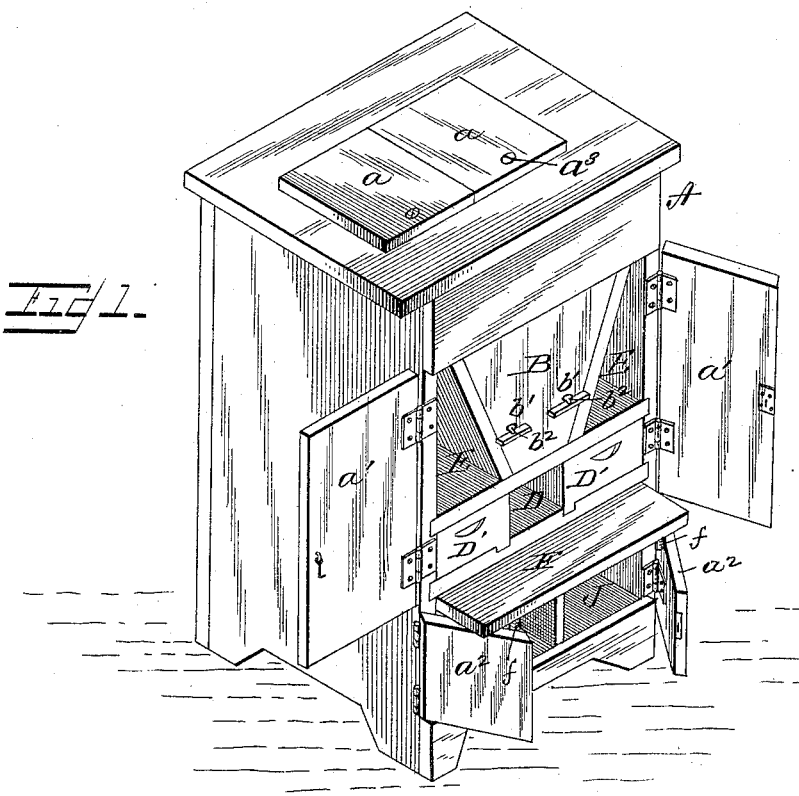
Figures 2, 3:
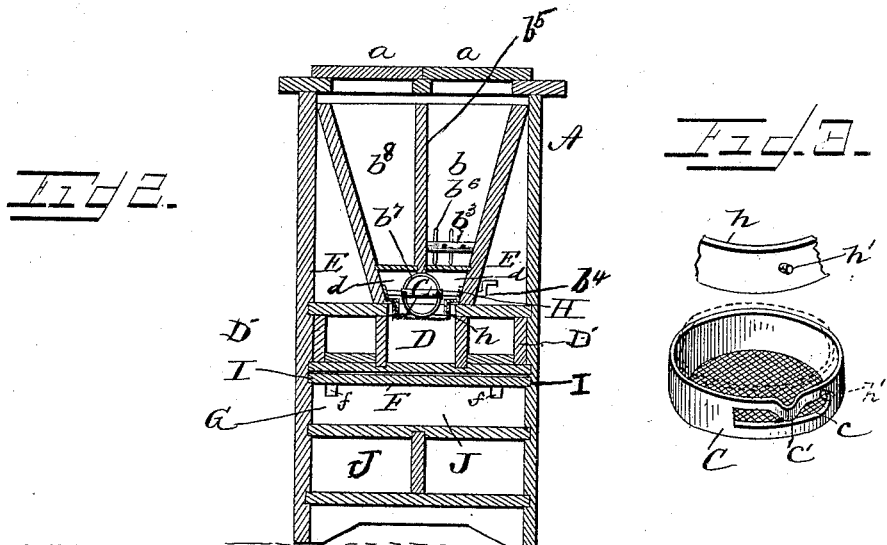

Figure 1 is a perspective view of my invention. Fig. 2 is a longitudinal sectional view. Fig. 3 is a view illustrating the details of parts, to be referred to hereinafter.

Referring to the drawings, the letter A designates the kitchen-safe proper, which is constructed with the top hinged lids $a$ pivotally secured thereto so as to be opened horizontally by means of the screws or pivots $a^3$. Said safe is also provided with the doors $a'$ and $a^2$. In the upper apartment of this safe there is located the hopper or bin B, having the vertical partition $b^5$, which divides the same into two compartments $b$ $b^8$, designed as repositories for meal and flour, respectively. In the bottom of this bin there are two sliding boards or cut-offs $b'$, which can be drawn out or pushed in by means of the handles $b^2$. Above one of said sliding boards $b'$, which are designed to let the flour or meal into the compartment $d$ that measures the quantity of same, there is located the roller $b^3$, journaled in the sides of said compartment so as to be operated from the outside of the safe. This roller is provided with the transverse bars $b^6$ for stirring the flour in the bottom of the flour-compartment with a view of preventing the same from caking.

It will be seen that in the bottom of the bin B there is a metallic lining H, with its sides contracting and terminating at its lower end with a neck $h$, upon which there is a projection or key $h'$; and that through said neck there passes a crank-shaft $b^4$, which has bearings and is journaled through the sides of said bin. This shaft has in its center the agitators or dashers $b^7$, by means of which the flour or meal is thoroughly pulverized and prepared for the sieve C. Directly under the agitators $b^7$ of the crank-shaft $b^4$, and upon the neck $h$ of the metallic lining H, there is located the removable sieve C. It will be observed by reference to Fig. 3 that this sieve contains a slot $c$ near its top, and that integrally therewith there is formed a projecting loop $c'$ through which the projection or key $h'$, upon the neck $h$ of the metallic lining H is adapted to pass when the sieve C is being removed or adjusted thereto. When said sieve is so adjusted, it is turned to the point indicated by the dotted lines, and is therefore held in its normal position by the key or projection $h'$. When it is necessary to remove said sieve for cleaning, the same is turned until the projection or key $h'$ is opposite the loop $c'$, when the sieve can be readily pulled off. In other words, said slot, loop, and projection, or key constitute a lock for removing and replacing and holding in its normal position the sieve C.

Under the sieve C there is provided the compartment D for the tray, which receives the meal or flour when sifted. Upon each side of the compartment D there are two drawers D', which are divided into any number of compartments for spices, &c.

Upon each side of the bin B are designed the compartments E for pans, cooking utensils, racks, &c.

Directly under the compartment occupied by the tray there is to be found the kneading-board F, which slides in and out upon the grooved bearings I in the sides of the safe. This board is provided with the projections $f$ upon the bottom of same, which, when the board is being drawn out for use, come in contact with the doors $a^2$ and open the same. These doors being opened assume the position illustrated in Fig. 1, and thereby afford a firm support for said kneading-board when in use. Owing to said construction and arrangement the doors $a^2$ are opened simultaneously with the withdrawal of the kneading-board F and provide a substantial support therefor.

G represents compartments for meat, butter, and eggs, and J J for milk, lard, and other necessaries.

Having fully described my invention what I claim as new, and desire to secure by Letters Patent, is—

The pantry and kitchen safe A, provided with the hinged doors upon the top of same communicating with the bin B, the bin B, located directly under said doors and in the upper part of said safe and divided into the compartments $b$, $b^8$, and $d$, the roller $b^6$, and the cut-off $b'$ in the bottom portion of the compartment $b$, the cut-off in the bottom portion of the compartment $b^8$, the crank-shaft $b^4$, extending through the compartment $d$ and journaled through the sides of said bin, the removable sieve C, located upon the neck $h$ of the metallic lining of said bin, the compartment D, directly under the sieve C, the drawers D' upon each side of the compartment D, the kneading-board F, located under the compartment D, and the drawers D' upon the grooved bearings I of the safe and having the downwardly-projecting projections $f$, the compartment G under said kneading-board, the compartments J J under the compartment G, and the hinged doors $a^2$, opening into the latter compartments J J and G, substantially as described, and for the purpose set forth.

In testimony whereof I affix my signature in presence of two witnesses.

WALTER ADOLPHUS JONES.

Witnesses:
DAVID RAINEY,
SAM GRIFFIN.